(12) United States Patent
Hsu

(10) Patent No.: US 6,203,723 B1
(45) Date of Patent: Mar. 20, 2001

(54) MICROENCAPSULATED LIQUID CRYSTAL HAVING MULTIDOMAINS INDUCED BY THE POLYMER NETWORK AND METHOD

(76) Inventor: Ying Yen Hsu, 2310 Friars La., Los Altos, CA (US) 94024

( * ) Notice: Subject to any disclaimer, the term of this patent is extended or adjusted under 35 U.S.C. 154(b) by 0 days.

(21) Appl. No.: 09/042,394

(22) Filed: Mar. 12, 1998

(51) Int. Cl.⁷ .............................. C09K 19/38; C09K 19/54

(52) U.S. Cl. .................................... 252/299.01; 252/299.5

(58) Field of Search ............................ 252/299.01, 299.5, 252/299.1; 349/10, 86; 428/402.2, 402.24

(56) References Cited

U.S. PATENT DOCUMENTS

| | | | |
|---|---|---|---|
| 3,499,702 | 3/1970 | Goldmacher et al. | 350/150 |
| 3,551,026 | 12/1970 | Heilmeir | 350/150 |
| 3,872,050 | 3/1975 | Benton et al. | 260/37 |
| 4,100,103 | 7/1978 | Foris et al. | 252/316 |
| 4,101,207 | 7/1978 | Taylor | 350/344 |
| 4,138,362 | 2/1979 | Vassiliades et al. | 252/316 |
| 4,193,889 | 3/1980 | Baatz et al. | 252/316 |
| 4,301,054 * | 11/1981 | Buirley et al. | 252/299.7 |
| 4,433,637 * | 2/1984 | Buirley et al. | 252/299.7 |
| 4,435,047 | 3/1984 | Fergason | 350/334 |
| 4,605,284 | 8/1986 | Fergason | 350/334 |
| 4,707,080 | 11/1987 | Fergason | 350/334 |
| 5,116,528 * | 5/1992 | Mullen et al. | 252/299.5 |
| 5,216,530 | 6/1993 | Pearlman et al. | 359/43 |
| 5,283,675 | 2/1994 | Ooi et al. | 359/51 |
| 5,335,101 | 8/1994 | Reamey | 359/52 |
| 5,405,551 | 4/1995 | Reamey et al. | 252/229.01 |
| 5,410,424 | 4/1995 | Konuma et al. | 359/51 |
| 5,427,713 | 6/1995 | Wartenberg et al. | 252/229.5 |
| 5,585,947 | 12/1996 | Havens et al. | 349/92 |
| 5,858,268 * | 1/1999 | Niiyama et al. | 252/299.01 |

FOREIGN PATENT DOCUMENTS

| | | |
|---|---|---|
| 0204537 | 6/1986 | (EP) . |
| 0238626 | 9/1986 | (EP) . |
| 8504262 | 9/1985 | (WO) . |

OTHER PUBLICATIONS

Paul S. Drzaic; J. Appl. Phys. 60(6), Sep. 15, 1986 American Institute of Physics, "Polymer Dispersed Nematic Liquid Crystal for Large Area Displays and Light Valves", pp. 2142–2148, J. Appl. Phys: 60(6), 1996.

Paul S. Drzaic et al.: SID 90 Digest, "12.1: High–Brightness Reflective Displays Using Nematic Droplet/Polymer Films", pp. 210–213., 1990.

Paul S. Drzaic et al.: SID 90 Digest, "12.1: High–Brightness Reflective Displays Using Nematic Droplet/Polymer Films", pp. 210–213., 1990.

P.P. Crooker et al.; SID 90 Digest, "12.2 A Color Display Using Polymer–Dispersed Chiral Liquid Crystals", pp. 214–216, 1992.

Deng–ke Yang et al. SPIE vol. 1257 Liquid Crystal Displays and Applications (1990), "Textures of Polymer–Dispersed Chiral Liquid Crystal Microdroplets", pp. 60–67.

(List continued on next page.)

*Primary Examiner*—Shean C. Wu

(57) ABSTRACT

A liquid crystal material containing polymer network forming material is microencapsulated by a method utilizing an interfacial polymerization which creates a combination of polyurethane and polyurea polymers or melamine fromaldehyde or urea formaldehyde polymer which form the capsule walls surrounding the discrete liquid crystal droplets. The prepolymer of urethane acrylate and acrylate within the liquid crystal capsules is cured under UV light irradiation to form a web-like structure and induce the formation of polydomain configuration of nematic director. This allows to produce the display having faster switching property and showing significant lower threshold voltage.

1 Claim, 2 Drawing Sheets

OTHER PUBLICATIONS

H. Molsen et al.; SID 92 Digest, "40.5: Deformed–Helix Ferroelectric Effect in Polymer–Dispersed Ferroelectric Liquid Crystals", pp. 773–775, 1992.

V. Ya. Zyryznov et al.; SID 92 Digest, "40.6: Polymer–Dispersed Ferroelectric Liquid Crystals as Display Materials", pp. 776–777, 1992.

Paul. S. Drzaic et al.; SPIE vol. 1080 Liquid Crystal Chemistry, Physics and Applications (1989), "High Brightness and Color Contrast Displays Constructed from Nematic Droplet/Polymer Films Incorporating Pleochroic Dyes", pp. 41–47.

B.G. Wu and Y.D. Ma; SID 90 Digest, "12.3: Minature Color Liquid Crystal Display", pp. 217–219, 1992.

John L. West et al.; SPIE vol. 1257 Liquid Crystal Displays and Applications (1990), Dichroic Dye Containing Polymer Dispersed Liquid Crystal (PDLC) Films, pp. 76–83.

J. De Baets et al.; Journal of the SID, 1/2, 1993, "A Polymer–Network Liquid–Crystal Poly–CdSe TFT Active–Matrix Display", pp. 189–193.

B.G. Wu et al.; SID 92 Digest, "Novel Fast–Switching Polymer–Dispersed Liquid Crystal Light Shutter and Display", pp. 583–586, 1992.

* cited by examiner-

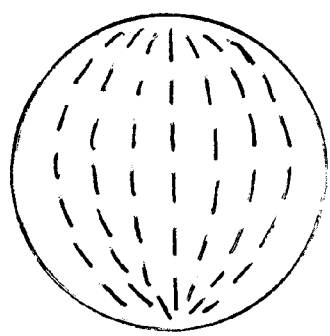
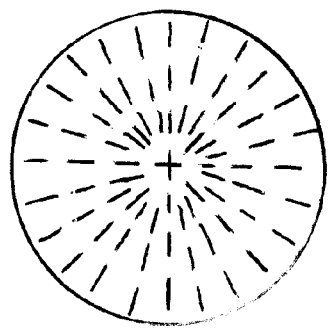
Fig. 1a (prior art)   Fig. 1b (prior art)
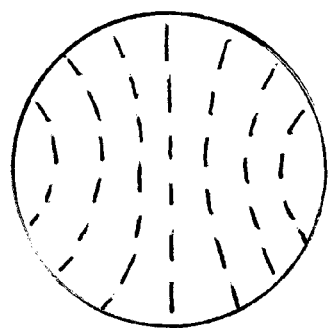
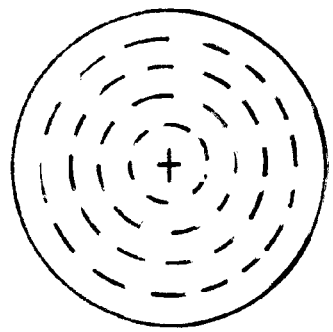
Fig. 1c (prior art)   Fig. 1d (prior art)
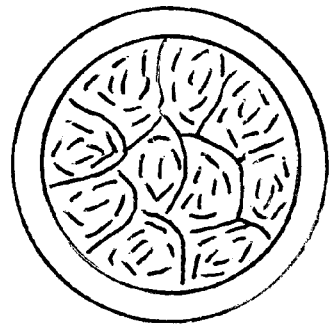
Fig. 2

MICROENCAPSULATED LIQUID CRYSTAL HAVING MULTIDOMAINS INDUCED BY THE POLYMER NETWORK AND METHOD

TECHNICAL FIELD OF INVENTION

The present invention relates generally to liquid crystals and, more particularly, to microencapsulated liquid crystals with multidomain configuration within the capsules and methods of making them. Additionally, the present invention relates to microencapsulated liquid crystals using dichroic, pleochroic or isotropic dyes,

BACKGROUND OF INVENTION

Liquid crystal materials are widely used in making liquid crystal displays for high content information flat panel devices, specifically for personal computers, projectors and televisions. Such devices usually require relatively low power and have a satisfactory response time, and are relatively economical. The property of liquid crystals enabling use, for example, in visual displays, is the ability of liquid crystals to transmit light on one hand, and to scatter light and/or absorb light, on the other, depending upon the alignment (or lack thereof) of the liquid crystal structure with respect to a prescribed input, such as an electrical field.

The conventional liquid crystal displays including twisted nematic, supertwisted nematic, thin film transistor twisted nematic and ferroelectric liquid crystal displays are prepared by filling liquid crystal materials directly into the liquid crystal display cells. These devices operate on the principal of light polarization. Due to the method in which the devices operate they suffer from reduced optical efficiency and require backlighting in order to achieve a good brightness on the display.

Currently there are three categories of liquid crystal materials, namely cholesteric, nematic and smectic types. The invention of the present application relates in the preferred embodiment described below to use of either a nematic, cholesteric, smectic A, or ferroelectric (chiral smectic C*) liquid crystal material or to a combination of liquid crystal types. The various characteristic of the cholesteric, nematic and smectic types of liquid crystal material are described in the prior art.

For many years, a class of new liquid crystal materials has been manufactured by treating such materials with a polymeric material to form a polymer dispersed liquid crystal for use in the manufacture of displays or other devices. U.S. Pat. No. 3,872,050, issued to Benton, relates to a polyurethane/liquid crystal dispersion system, in which cholesteric liquid crystal is dispersed as discrete naked aggregates in a polyurethane film. U.S. Pat. No. 4,101,207, issued to Taylor, relates to a liquid crystal/polymer film which is formed by: 1) casting a polymer solution containing liquid crystal, or 2) mixing liquid crystal with a polymerizable monomer or prepolymer followed by polymerization. More recently, these technologies have been improved further by the use of more suitable liquid crystal and polymeric binder materials to fabricate the electronic displays and light shutters, for example. These technologies basically include three distinct methods, an emulsion method, a phase separation method and a microencapsulation method.

An example of an emulsion method is disclosed in U.S. Pat. No. 4,435,047, issued to Fergason. The encapsulated liquid crystal droplets, which are dispersed in a polyvinyl alcohol film, are opaque in the off state. However, they become transparent when an electric field is applied. The liquid crystal/polymer film called nematic curvilinear aligned phase (NCAP) film is prepared by emulsifying liquid crystal material, generally a nematic type liquid crystal material, in aqueous polyvinyl alcohol. The emulsion is drawn down on an indium-tin oxide coated substrate, which is then laminated by another indium-tin oxide film after drying. This liquid crystal/polymer film based on a light scattering does not require the polarizers to function. However, this manufacturing process permits contamination by the impurities which are contained in the process' water and dispersing agents (e.g. polyvinyl alcohol or latex) to be transmitted to the liquid crystal material. In the Drzaic article, Journal of Applied Physics, Volume 60, NO. 6, Sep. 15, 1986, at pages 2142–2148, it is reported that an aqueous based NCAP system is an interpenetrating network of liquid crystal in a polymer matrix, rather than an encapsulated liquid crystal. Furthermore, U.S. Pat. No. 4,707,080, issued to Fergason, relates to a plurality of liquid crystal volumes which are interconnected. In addition, U.S. Pat. No. 5,216,530, issued to Pearlman et al, relates to the encapsulation of a smectic phase liquid crystal in a polymer matrix (known as NCAP). See also Drzaic et al articles, SID 90 Digest, at pages 210–213.

EP 0238 626 relates to a phase separation method utilized to obtain a light modulating material. The material is prepared from an isotropic solution of liquid crystal and prepolymer, which can be a monomer or a mixture of a monomer and an oligomer. Under an ultraviolet or an electron beam irradiation, the liquid crystal droplets segregate from the insoluble polymer matrix. The liquid crystal droplets are then located in cavities within a continuous polymer matrix layer.

WO 85/04262 relates to liquid crystal droplets which are dispersed in an epoxy resin to form a new light modulating material. The film produced also exhibits an opaque characteristics in the off state, while exhibiting a clear characteristic when an electrical field is applied.

U.S. Pat. Nos. 3,499,702 and 3,551,026 relates to the incorporation of pleochroic dyes in liquid crystal materials, in order to enhance contrast. This is accomplished by the fact that pleochroic dyes align parallel to nematic liquid crystal director and respond to an electric field in a liquid crystal like manner.

In the Drzaic et al article, SID 92 Digest, at pages 571–574, it is reported that a dichroic based liquid crystal film prepared by NCAP technology demonstrates that there are possible applications, in portable high information density displays, without the requirement of backlighting. However, the device's useful life time is dependent upon capability of finding a dichroic dye with a long period of stability and the liquid crystal material's charge holding capability. The dichroic based NCAP film suffers problems due to the fact that the dye is exposed to moisture, air and ionic impurities existing in polymeric binder. As a result, dichroic dyes suffer stability problems.

For the polymer dispersed liquid crystal (PDLC) manufactured by a phase separation method, the liquid crystal material is dissolved in polymeric resin and placed between two indium-tin oxide coated substrates and is irradiated by ultraviolet light or electron beam in order to cure the resin. The liquid crystal material used in a PDLC may be either nematic, cholesteric or ferroelectric. See Crooker et al article, SID 90 Digest, at pages 214–216; Yang et al article, SPIE Liquid Crystal Displays and Applications, Volume 1257, 1990, at pages 60–67; Molsen et al article, SID 92 Digest, at pages 773–775; and Zyryanov et al article SID 92 Digest, at pages 776–777, for example, The optical films prepared by this method suffer some drawbacks as well. For instance, one of these drawbacks is the component in the system of liquid crystal/polymer are mutually soluble and can not be completely separated during phase separation. This causes a decrease in the liquid crystal/polymer film contrast, which specifically effect the dichroic based PDLC. This is due to the fact that only dye dissolved in the liquid crystal droplets can exhibit the dichroic properties for the guest-host effect.

U.S. Pat. No. 5,585,947, relates a method for making liquid crystal composite which has an interfacial material disposed between liquid crystal and encapsulating medium.

U.S. Pat. No. 4,100,103 relates a capsule wall is formed by the condensation of melamine-formaldehyde in the presence of a negatively-charged, carboxylsubstituted, linear aliphatic hydrocarbon polyelectrolyte material dissolved in the capsule manufacturing vehicle. This method has been used to encapsulate the inner phase materials such as a mixture of dye dissolved in oily material. There is no examples describing the microencapsulation of liquid crystal for an electronic display application where the refractive index of the capsule wall should be closely matched with the liquid crystal and the binder material.

U.S. patent application Ser. No. 08/827,574 filed by Hsu, discloses the microencapsulation method for adjusting the capsule wall refractive index by an interfacial polymerization of polyurethane/polyurea or polyurea structures and there also exists a highly cross-linked structure within the polymer film. Further, the capsule wall may be manufactured so as to be transparent, in order to be more suitable for use in an electronic display application.

The liquid crystal/polymer film preparation methods described in the prior art are all relates to the formation of monodomain liquid crystal configuration within the liquid crystal droplets or microcapsules. The liquid crystal director aligns in four major configurations e.g. radiant, bipolar, axial and toroidal (concentric) according to the liquid crystal and wall surface interaction (wall surface anchoring situation). The creation of scattering from liquid crystal/polymer film is basically due to the mismatch of the refractive index between liquid crystal material ($n_o$ and $n_e$) and polymeric binder ($n_p$) in the off state. On the other hand, the liquid crystal/polymer film should be transparent in the on state.

In the De Baets et al article, Journal of the SID, ½ 1993, at pages 189–193, it relates to the development of a polymer-network liquid crystal display (PNLCD) by curing a mixed solution of liquid crystal and UV-curable acrylic monomer and photoinitiator in a conventional display cell at a slightly higher temperature than the nematic-to-isotropic transition temperature of the solution. The PNLCD shows a fast switching speed and high transmission at low operating voltage, In the Wu et al article, SID 92 Digest at pages 583–586, it is reported that a sub-micron size droplet network is formed within PDLC droplets by incorporating a PVF thermoplastic and prepolymer resin in liquid crystal. The prepared PDLC film showed extremely fast switching time at a high threshold turn-on voltage (about 70 volts).

According to the present invention, the operating voltage reduction, and the optical efficiency improvement may be achieved by formation of cross-linked web-like structure (polymer network) within liquid crystal microcapsules. The web-like structure induces the disclination of liquid crystal alignment and formation of multidomain (polydomain) liquid crystal configuration. The web-like structure is a three-dimensional polymer network randomly oriented in a liquid crystal within a micro-capsule. The liquid crystal molecules form a continuous layer within the micro-capsule.

SUMMARY OF THE INVENTION

This invention relates a micro-capsule comprising liquid crystal material encapsulated in 1) polyurethanelpolyurea or polyurea polymer wall and 2) melamine-formaldehyde or a urea-formaldehyde polymer wall. The liquid crystal material is aligned in a polydomain configuration. The liquid crystal which is to be microencapsulated, may be either a nematic, cholesteric, smectic A, or ferroelectric.

In another aspect this invention also relates to a composition for use in preparing microencapsulated liquid crystal comprising 1) a liquid crystal, a polyisocyanate, a polyol, a polyamine, a photoinitiator, a prepolymer of urethane acrylate and acrylate or 2) a liquid crystal, a melamine-formaldehyde or a urea-formaldehyde, a photoinitiator, prepolymer of urethane acrylate and acrylate.

In still another aspect this invention relates to a method of making a microencapsulated liquid crystal droplet with a capsule wall composed of 1) a polyurethane/polyurea or polyurea or 2) a melamine-formaldehyde or a urea-formaldehyde by interfacial polymerisation. The liquid crystal may contain a dichroic dye, pleochroic dye or isotropic dye.

In yet another aspect the present invention relates to a method of making a web-like structure (polymer network) within the microencapsulated liquid crystal droplet to induce a formation of liquid crystal polydomain configuration by polymerisation of prepolymer of urethane acrylate and acrylate under a UV light or an electron beam irradiation.

BRIEF DESCRIPTION OF THE DRAWINGS

FIGS. 1a–1d are the illustrations of the monodomain configurations of nematic director in the conventional liquid crystal droplets. FIG. 1a, bipolar; FIG. 1b, radiant; FIG. 1c, axial and FIG. 1d, toroidal.

FIG. 2 is an illustration of a polydomain configuration of a random nematic director in a liquid crystal microcapsule.

DETAILED DESCRIPTION OF THE INVENTION

Figure 3:
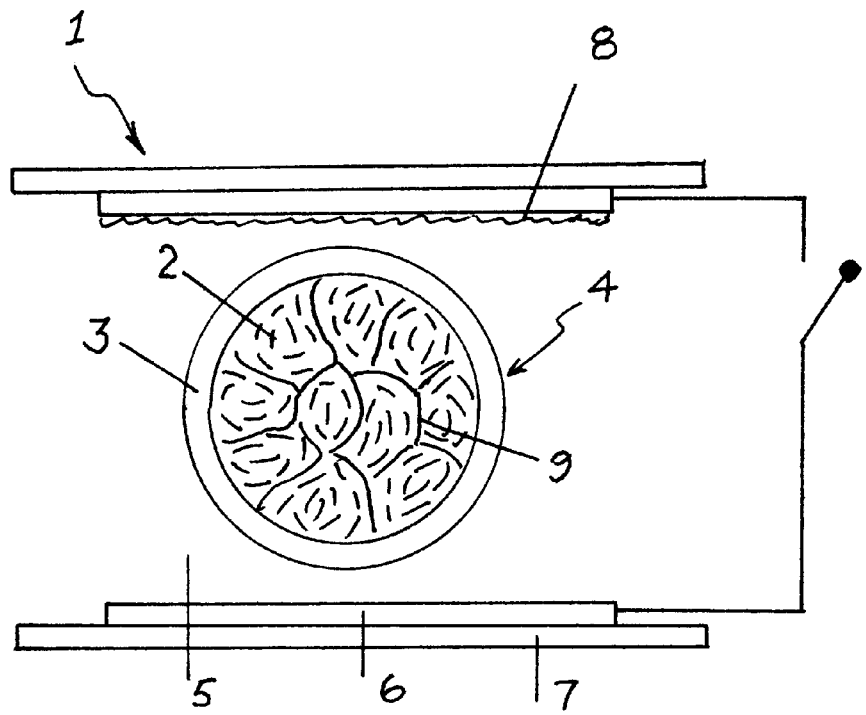
FIG. 3 is an illustration of a preferred liquid crystal display in an unpowered state, made utilizing a microencapsulated liquid crystal material containing polydomain configuration.

As discussed above, the present invention relates to composition comprising 1) a liquid crystal material, a polyisocyanate, a polyol, a polyamine, a prepolymer of urethane acrylate and acrylate, and a photoinitiator or 2) a liquid crystal material, a melamine-formaldehyde, a prepolymer of urethane acrylate and acrylate, and a photoinitiator.

In one embodiment, the amount of each component is 3–10 parts polyisocyanate, 1–15 parts prepolymer of urethane acrylate and acrylate, 0–6 parts polyol and 0–6 parts polyamine to 100 parts liquid crystal, and 1.5–3 parts photoinitiator to 100 parts prepolymer.

According to the present invention, the microencapsulated liquid crystal is prepared by an interfacial polymerization, e.g., polyaddition/polycondensation, to form either a polyurethanelpolyurea or polyurea thin capsule wall which encloses the dispersed liquid crystal droplets. The polymers are prepared by reacting a polyisocyanate and at least one of a polyol or a polyamine.

The polyisocyanate contains from 2 to 8 or prferably from 2–3 isocyanate (—NCO) groups. The polyisocyanate is capable of forming capsule wall, with high cross-linked density and may be aliphatic or aromatic. The commercial polyisocyanate, for example, Desmodur N-100, N-3200, N-3300 and N-3390 are available from Bayer Corporation. The other trifunctional isocyanate is an adduct of trimethylolpropane and 1,6-hexamethylene diisocyanate. Other difunctioanl isocyanates include 1,6-hexamethylene diisocynate, bis-(4-isocyanatocyclohexyl)methane, isophorone diisocyanate, tolylene-2,4-diisocyanate, tolylele-2,6-diisocyanate and diphenylmethane-4,4-diisocyanate, all available from Bayer Corporation. In one embodiment, the polyfunctional ioscyanates may be soluble in liquid crystal material and do not react with the liquid crystal material or other components found in the liquid crystal material.

The polyol contains at least two primary alcohol groups and is water soluble. The water soluble diol, triol and dithiol to be used in the present invention include the following structures: diethylene glycol, 2,2'-thiodiethanol, 2-mercaptoethyl sulfide, 2-mercaptoethyl ether, triethylene glycol, 2-methylpropane-1,3-diol, 2-ethylpropane-1,3-diol, 2-n-propylpropane-1,3-diol, 2-n-butylpropane-1,3-diol, 2-methyl 2-n-butylpropane-1,3-diol, diethanolamine, triethanolamine, N-n-butyldiethanolamine, N-ethyldiethanolamine, N-methyldiethanolamine, tris(hydroxymethyl)aminomethane, trimethylolpropane, pentaerythritol, 1,4-butanediol, 1,6-hexanediol, 2,2-bis(hydroxymethyl)propionic acid, dimethylolmelamine, trimethylolmelamine, hexamethylolmelamine, 1,4-cyclohexanedimethanol, glycerol and mixtures thereof. Triethanolamine, N-n-butyldiethanolamine, N-ethyldiethanolamine, N-methyldiethanolamine, can serve as tertiary amine catalyst as well as film-forming polyol.

The polyamine contains 2–5 amino groups and is water soluble. The water soluble primary diamines and polyamines include: ethylenediamine, 1,4-butanediamine, 1,6-hexanediamine, diethylenetriamine, triethylenetetramine, tetraethylenepentamine, melamine or mixtures thereof.

In one embodiment, the reaction occurs in the presence of an aqueous solution of polyvinyl alcohol (PVA). Typically the aqueous solution has a concentration of about 10% by weight PVA.

Specifically the liquid crystal material may be, for example, either a nematic, a cholesteric, or a smectic liquid crystal material. Some commercially available examples of such E49 (available from BDH Chemicals) and ROTN 564 (available from Hoffman La Roche).

In still another embodiment, the tertiary amine Dabco (an abbreviation for 1,4-diazabicyclo[2,2,2]octane, also called triethylenediamine), which is available from Aldrich Chemical Co., is used as a catalyst to enhance the reaction rate.

According to the present invention, an alternative method is the microencapsulation of liquid crystal using melamine-formaldehyde and urea-formaldehyde by polycondensation. The liquid crystal containing prepolymer of urethane acrylate and acrylate, and photoinitiator is emulsified in a dispersing agent, for examples, 5% EMA copolymer (available from Zeeland Chemicals) or 5% Gantrez AN-119 (available from GAF Corporation). The dispersing agent is prepared by dissolving EMA copolymer or Gatrez AN-119 in water at warm temperature and its pH is adjusted to 4–5 by adding either NaOH, KOH, triethanol amine or diethanolamine solution. The microencapsulation is carried out by adding either a 30% Cymel 385, Cymel 372 or Beetle 65 aqueous solution (available from Cytec Industries) to create a thin film surrounding the liquid crystal droplet at temperature of 60–90° C.

According to the present invention, the web-like structure within a liquid crystal capsules is formed by curing the liquid crystal/polymer film in which liquid crystal capsule containing the the prepolymer of urethane acrylate and acrylate, and a photoinitiator under UV light. The prepolymer of urethane and acrylate, and acrylate should be soluble in liquid crystal and inert to liquid crystal and the other material dissolved in the liquid crtstal. The prepolymer to be used to create a web-like structure within the liquid crystal capsule include a monomer and an oligomer of acrylate, methacrylate, epoxy acrylate, urethaneacrylate, liquid crystal acrylate. The amount to be used is about 1–20, preferably 1–15 parts, of prepolymer to 100 parts of liquid crystal. The prepolymer contains at least 1–6 double bonds (acrylate or allyl moieties) in a molecule.

For example, 2-hydroxyethyl methacrylate (glycol methacrylate), di(ehtylene glycol) bis(allyl carbonate), di(ethylene glycol) diacrylate di(ethylene glycol) dimethacrylate, trimethylolpropane triacrylate, trimethylol propane trimethacrylate, trimethylolpropane diallylther, pentaerythritol triacrylate, pentaerythritol tetramethacrylate, 1,4-butanediol diacrylate, 1,4-buthanediol dimethacrylate, 1,6-hexanediol diacrylate ,tri(ethylene glycol) diacrylate, tri(ethylene glycol)dimethacrylate, poly(n-butylmethacrylate), buthane diacrylate, 2,4,6-triallyloxy-1,3-5-triazine and the commercially available Master bond UV 10, UV 2000 (available from Poly Chem Corporation), UV curable epoxy and the mixture thereof.

The Photoinitiators to be used in the liquid crystal/polymer film preparation include: benzoinmethylether, benzoinethylether, benzoinisobutylether and benzophenone (available from Aldrich Chemical Co) and 2,2-dimethyl-2-phenylacetophenone (available from Sigma).

The commercially unavailable urethane acrylate monomer or oligomer can be prepared either in liquid crystal or solvent by the following method. In case of solvent, the crude monomer or oligomer can be purified before mixing with liquid crystal. If it is prepared in the liquid crystal, the reaction mixture can be used directly to mix with liquid crystal containing other ingredients for the further microencapsulation process.

The method of this invention may be combined with the method of copending, assigned application of Hsu, entitled "Microencapsulated Liquid Crystal and Method," Ser. No. 08/827,574, filed Mar. 28, 1997, the disclosure of which is incorporated herein by reference.

Polyisocyanate (capsule wall forming material), photoinitiator and dichroic dye are dissolved in a portion of liquid crystal. The prepolymer (web-like structure forming material) of urethane acrylate and acrylate is dissolved in another portion of liquid crystal separately. Then the two mixture are combined homogeneously and poured into a 10% PVA aqueous solution and emulsified at 50° C. and high rpm to obtain 1–5 micron droplet. The emulsion is kept at 50° C. and low rpm for 8–10 hours. During this process, triethanolamine and 10% Dabco are added. After the completion of reaction, a 10% $NH_4OH$ aqueous solution is added. The resulting slurry is kept at room temperature overnight. The slurry is then purified by a centrifuging to obtain a near monodispersed capsule size. The wet cake is re-dispersed in a binder containing a little amount wetting agent and is drawn down on to a indium-tin oxide coated substrate. After the film is dried a layer of adhesive is applied and then is laminated with another indium-tin oxide substrate onto it. The film is irradiated under UV lamp to cure both adhesive and prepolymer which then forms a polymer network within the liquid crystal capsules. The amount of polymer network forming material can be in the range of 1.5 to 6%, preferably between 2.5 to 4%.

At least one of the polymer network forming materials may contain one primary hydroxy group and 1–6 acrylate groups. The hydroxy group is designed to react with the film-forming material, polyisocyanate, to form urethane acrylate which anchors to the inner surface of the capsule wall. The available acryalte groups then react with the other urethane acrylate or acrylate monomer/origomer to form a polymer network. The prepolymer can be cured in nematic or isotropic phase with or without electric field. The highly cross-linked polymer network within the liquid crystal droplet is stable in wide temperature range compared to the thermoplastic material like PVF.

The multidomain configuration within liquid crystal capsule produces display having faster switching properties and haze-free transparent state with large viewing angle, and shows a significantly lower threshold switching voltage.

The purified microcapsule wet cake is thoroughly mixed with aqueous polymeric binder and small amount wetting agent. The polymeric binder is typically used at a concentration of about 20%. The wetting agent is typically used at a concentration of about 0.1 to 0.6%. After the removal of any air bubbles, the coating material is ready for optical-film preparation. It is coated on a indium-tin oxide polyester film by a doctor blade with a wet film thickness of about 1 mil. The wet film is first air dried and then heated to remove the moisture. A layer of ultraviolet curable adhesive is applied to the dried coating film and another indium-tin oxide polyester film is laminated on to it with a roller. The film is exposed under the ultraviolet light, in order to cure both the adhesive and polymer network forming material, thus forming a liquid crystal/polymer film. The liquid crystal droplets are now microencapsulated by a very thin capsule wall of about 0.01 to about 0.1 micron.

The fabrication of pleochroic based liquid crystal/polymer film is the same as the above-mentioned process. The pleochroic dye used should be inactive to the chosen polyisocyanate film former and the other material dissolved in liquid crystal. A pleochroic dye possessing the following characteristics is preferred: a high order parameter; high extinction coefficient; high photo stability; and high solubility in the chosen liquid crystal material.

The visual 10% threshold voltage and 90% saturation voltage are measured at 60 Hz and sine wave.

Figure 4:
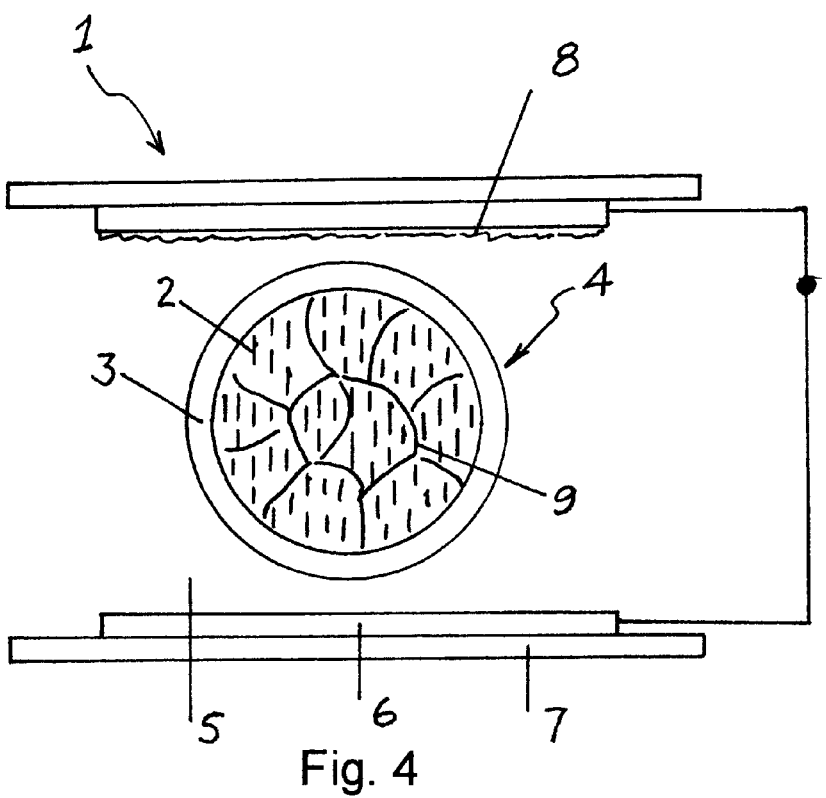
FIG. 4 is an illustration of a preferred liquid crystal display in a powered state, made utilizing a microencapsulated liquid crystal material containing polydomain configuration.

Referring now in detail to the drawing, FIGS. 1a–1d are the illustration of the monodomain configurations of nematic director in the conventional liquid crystal droplets. FIG. 1a, bipolar; FIG. 1b, radiant; FIG. 1c, axial and FIG. 1d, toroidal. FIG. 2 is an illustration of a polydomain configuration of liquid crystal director induced by a polymer network (web-like structure) in a liquid crystal capsule. FIG. 3 illustrates a preferred liquid crystal/polymer film display I of the present invention consisting of the liquid crystal droplets 2 microcapsulated by the capsule wall 3 to form the discrete liquid crystal microcapsules 4, which are dispersed in polymeric binder 5 and are coated on the indium-tin oxide 6 coated substrate 7. A layer of adhesive 8 is applied, then it is laminated with another indium-tin oxide 6 coated substrate 7 to form a liquid crystal/polymer film 1. Under UV light, the UV-curable prepolymer forms a web-like structure 9 and induce nematic director assuming a polydomain configuration. In the unpowered state the mismatch of refractive index among the liquid crystal 2, capsule wall 3, polymeric binder 5, adhesive 8 and web-like structure 9 cause the film to scatter the light. As a result, the film 1 is opaque or translucent. Turning now to FIG. 4 the device from FIG. 3 is depicted in a powered state. In this state, the director of liquid crystal 2 aligns parallel to the applied field and the film becomes clear and transparent. This enables for a reduction of operating voltage and an improved optical efficiency of the liquid crystal/polymer film.

The following examples relate to microencapsulated liquid crystal material having polydomain configuration.

EXAMPLE 1

A mixture of 0.15 g of Desmodur N-3200, available from Bayer Corporation) and 2.5 g of E49 (available from BDH Chemicals) was heated with stirring for 10 minutes. Then 0.0029 g of benzoin methyl ether, 0.0132 g of pentaerythritol triacrylate (both available from Aldrich Chemical Co.) and 0.075 g of PN393 (available from BDH Chemicals) were added to the above solution and stirred for 10 minutes without heating. The resulting solution was then poured into 18 g of 10% aqueous polyvinyl alcohol solution (Airvol V205, available from Air Products) which was undergoing constant stirring, and was emulsified using Dyna-Mix sitrrer (avilable from Fisher Scientific) at 50° C. and 6000 rpm for 3 minutes to obtain the particle size of 1 to 5 microns. The stirring speed was reduced to 2500 rpm and the reaction was continued at 50° C. for 8 hours. During the reaction, 0.3 g of 10% Dabco, 0.60 g of 50% triethanol amine and 0.3 g of 10% ethylenediamine (all available from Aldrich Chemical Co.) were added to the solution. After the reaction was complete, 0.37 g of 10% $NH_4OH$ was added to the solution, then the slurry was allowed to stand overnight. The resulting slurry was then purified using IEC HN-SII centrifuge to obtain narrow particle size distribution of 2 to 4 microns. The microencapsulated liquid crystal wet paste was redispersed in 20% aqueous PVA binder containing a wetting agent (DC 5089, available from Dow Corning) and was drawn down using a doctor blade (1 mil thick, available from Gardner Technical Service) on the indium-tin oxide coated polyester sheet (available from Southwest Technologies). After allowing the film to dry, a layer of an adhesive (e.g., NOA68, a polyurethane adhesive, available from Norland Optical Inc.) was applied and another indium-tin oxide polyester sheet was laminated on it to form a display film with a film thickness about 12 microns. The prepared film was irradiated under UV light at 365 nm (available from Spectronics Coporation) to induce the formation of web-like structure in the liquid crystal capsule. The UV-cured film exhibited an opaque characteristic in the off state and turned to transparent at 15 volts and 60 Hz with 90% transmission.

EXAMPLE 2

A mixture of 0.06 g of M778 (a black dye mixture, available from Mitsui Toatsu Chemicals) in 4.5 g of E49 was heated with stirring for 2 hours. The resulting solution was kept at room temperature overnight. The solution was filtered through 0.2 micron PTFA membrane (available from Aldrich Chemical Co.), 0.18 g of Desmodur N-3200, 0.0035 g of benzoin methyl ether, 0.01 g of 2-hydroxyethylmethacrylate (available from Aldrich Chemical Co.), 0.01 g of pentaerythritol triacrylate and 0.09 g of PN393 were dissolved in 3 g of M778/E49 with stirring for 15 minutes. The solution was then poured into 20 g of 10% PVA, which was undergoing stirring, and was emulsified at 50° C. and 6000 rpm for 3 minutes to obtain the particle size of 1 to 5.5 microns. The stirring speed was then reduced to 2500 rpm and the reaction was continued at 50° C. for 10 hours. During the reaction, 0.40 g of 10% Dabco and 0.8 g of 50% triethanolamine, 0.4 g of 10% ethylenediamine and 0.07 g of dibutyltin dilaurate were added to the solution. After the reaction was complete, 0.45 g of 10% $NH_4OH$ was added to the solution. The slurry was allowed to stand overnight and then purified using IEC HN-SII centrifuge to obtain narrow particle size distribution of 2 to 4.5 microns. The liquid crystal/polymer film was prepared as a process described in Example 1. The PVA dispersed film exhibited a black opaque characteristic in the off state and turned to transparent at about 15 to 20 volts and 60 Hz with 90% transmission.

EXAMPLE 3

A mixture of 0.3 g of Desmodur N-3200 and 5 g of ROTN 564 (available from Hoffman La Roche) was heated with stirring for 15 minutes. Then 0.0060 g of benzoin mehtyl ether, 0.0145 g of pentaerythritol triacrylate, 0.012 g of 2-hydroxyethyl methacrylate and 0.175 g of PN393 were added into the above solution and stirred for 15 minutes without heating. The solution was then poured into 20 g of 10% PVA, which was undergoing constant stirring, and was emulsified at 50° C. and 6000 rpm for 2 minutes to obtain the particle size of 1 to 7 microns. The stirring speed was reduced to 2500 rpm and the reaction was continued at 50–55° C. for 10 hours. During the reaction 0.50 g of 10% Dabco, 1.2 g of 50% triethanolamine and 0.6 g of 10% ethylenediamine were added to the solution. After the reaction was complete, 0.75 g of 10% $NH_4OH$ was added to the solution, then the slurry was allowed to stand at room temperature overnight. The resulting slurry was purified using IEC HN-SII centrifuge to obtain narrow particle size distribution of 2–5 microns. The liquid crystal/polymer film was prepared as a process described in Example 1. The PVA dispersed film exhibited an opaque characteristic in the off state and turned to transparent at about 15 volts and 60 Hz with 90% transmission.

EXAMPLE 4

A mixture of 2.5 g of E49, 0.15 g of PN393, 0.010 g of pentaerythritol triacrylate and 0.0048 of benzoin methyl ether was emulsified into 20 g of 5% EMA copolymer solution,(previously neutralized to pH 4.5, available from Zeeland Chemicals) at temperature of 65–75° C. A 30% of Cymel 385 solution (available from Cytec Industries) was added. The stirring was continued at 6000 rpm for 5 minutes. Then the stirring speed was reduced to 2500 rpm and the reaction was continued at the same temperature for three hours. The resulting slurry was purified using a centrifuge. The liquid crystal/polymer film was prepared as a process described in Example 1, and exhibited an opaque characteristic in the off state and turned to transparent at about 15 to 20 volts and 60 Hz with 90% transmission.

What is claimed is:

1. A composition for use in preparing microencapsulated liquid crystal material, comprising (A) a liquid crystal; (B) a capsule wall forming material including (1) a polyisocyanate, a water soluble polyol or a polyamine, or (2) a melamine fromaldehyde or a urea formaldehyde, and; (C) a polymer network forming material including, a prepolymer of urethane acrylate, acrylate or ally derivative; and (D) a photoinitiator, wherein the prepolymer of acrylate or ally derivative is selected from the group consisting of 2-hydroxyethyl acrylate, 2-hydroxyethyl methacrylate, di(ethylene glycol) diacrylate, di(ethylene glycol) dimethacrylate, trimethylolpropane trimethacrylate, pentaerythritol triacrylate, pentaerythritol tetramethacrylate, 1,4-butanediol diacrylate, 1,4-buthanediol dimethacrylate, 1,6-hexanediol diacrylate, 1,6-hexanediol dimethacrylate, tri(ethylene glycol) diacrylate, tri(ethylene glycol) dimethacrylate, bis(allyl carbonate), trimethylolpropane diallylether, 2,4,6-triallyoxy-1,3,5-triazine, epoxy acrylate, liquid crystal acrylate and mixtures thereof.

* * * * *